UNITED STATES PATENT OFFICE.

OTTO HOFFMANN, OF MAINKUR, NEAR FRANKFORT-ON-THE-MAIN, GERMANY, ASSIGNOR TO LEOPOLD CASSELLA & CO., OF FRANKFORT-ON-THE-MAIN, GERMANY.

COLORING-MATTER DERIVED FROM NAPHTHOL.

SPECIFICATION forming part of Letters Patent No. 316,036, dated April 21, 1885.

Application filed February 20, 1884. (No specimens.) Patented in Germany January 19, 1884, No. 28,065; in England January 28, 1884, No. 2,269, and in France January 31, 1884, No. 160,032.

*To all whom it may concern:*

Be it known that I, OTTO HOFFMANN, of Mainkur, near Frankfort-on-the-Main, in the Empire of Germany, assignor to LEOPOLD CASSELLA & CO., of Frankfort-on-the-Main, have invented new and useful Improvements in the Manufacture of Dye-Stuffs or Coloring-Matters, of which the following is a specification.

My invention relates to a new dye-stuff which results from the reaction of nitrosonaphtholsulphonic acid or its salts upon iron or its salts. The nitrosonaphtholsulphonic acids or their salts are formed by the action of molecular quantities of nitrite of sodium and muriatic acid upon the naphtholsulphonic acids or their salts dissolved or finely suspended in water. The nitroso compounds can be separated and dried in the usual manner, or they can be used in the solutions in which they are formed.

My new dye-stuff is known as "naphthol-green," and is prepared as follows: 27.5 kilos of nitrosoalphanaphtholmonosulphonate of sodium (prepared from the alphanaphtholmonosulphonic acid corresponding with the difficultly-soluble alphanaphthylamine sulphonic acid) are dissolved in one hundred liters of hot water. I let this solution cool down, and then I add twenty liters of dissolved perchloride of iron containing five kilos $Fe_2Cl_6$. The yellow-brownish solution becomes dark brown and finally deep black. After several hours standing the excess of iron is precipitated by an alkali, and the filtered solution, showing a pure green color, is evaporated or precipitated with common salt. The green dye-stuff can be obtained in a pure state by crystallization out of water or diluted alcohol, or by precipitation from the alkaline aqueous solution by the solution of a lead salt. The coloring-matter deposits in form of an insoluble basic lead salt, which is washed with water and rendered soluble with diluted sulphonic acid or with the sulphate or carbonate of an alkali.

For the preparation of the nitroso compound all other naphtholsulphonic acids, with the exception of the betanaphtholalphamonosulphonic acid and the betanaphtholgammadisulphonic acid may be used in place of the alphanaphtholmonosulphonic acid mentioned above, the difference in shade and qualities of naphthol-green produced by the different acids being but very slight.

Naphthol-green prepared with the betanaphtholmonosulphonic acid of Schaeffer is characterized by its being very soluble and crystallizing less easily. From its aqueous solution it is not precipitated by addition of common salt.

In place of the sodium salt of nitrosonaphtholsulphonic acid, other salts or the free acids may be used. In place of the perchloride of iron, other iron salts may be used with the same effect. Metallic iron and salts of the protoxide of iron act also in a similar manner, and, according to the quantity of iron or iron salts employed, the color obtained can be varied from a pure-green to a dark-olive shade. The coloring-matters formed in this manner by iron or salts of the protoxide of iron are mixtures of naphthol-green with other combinations of a dark-brown color.

The figures I have given in the above-described example with regard to dilution, temperature during the reaction, quantity of perchloride of iron, and manner of purifying the dye-stuff may be altered within wide limits. I also obtain similar results by starting from the naphtholsulphonic acids. In this case I add to their aqueous solution an iron salt, and then I treat the mixture with nitrous acid. If the formation of the color is executed in presence of a material to be dyed, the color deposits direct upon the fiber. For this purpose the acidulated dye-bath has to contain nitrosonaphtolsulphonic acid or a salt of this acid and an iron salt.

The green dye-stuff or coloring-matter prepared in the above-described manner belongs to a new class of metallo-organic compounds in which the metal cannot be traced without destroying the color, and presents the following characteristics:

After being dried and powdered, naphthol-green has the appearance of a green powder, which is easily soluble in cold water with a pure yellow-green color. Alcohol, benzole, or glacial acetic acid do not dissolve the color. Alkalies do not alter its shade, while strong mineral acids destroy the color in re-engendering nitrosonaphtholic acid, which can be recovered by crystallization or by salting out. Neutralization of the acid makes the color reappear. Sulphydrate of ammonia precipitates after some time black sulphide of iron, while the solution becomes discolored. In an acidulated dye-bath the new colors dye wool, silk, and other fabrics a dark-green shade, which the dyers have hitherto obtained, usually, by combined application of a yellow dye-stuff and of carmine of indigo. Addition of sulphate of iron—about one-half gram per liter—to the dye-bath, previously acidulated, increases the depth and brightness of the shade.

Having thus fully described the nature of my invention, what I claim as new, and desire to secure by Letters Patent, is—

1. The process herein described for producing green coloring-matters, (either as a substance or as a green color on material to be dyed,) which consists in the reaction of nitrosonaphtho-sulphonic acids or their salts upon iron or its salts, or in the reaction of nitrous acid upon naphtholsulphonic acids treated with iron or its salts, substantially as set forth.

2. The green coloring-matter herein described, derived from naphthol, soluble in cold water, insoluble in alcohol, benzole, or glacial acetic acid, and decomposed by strong mineral acids.

In testimony whereof I have signed my name to this specification in the presence of two subscribing witnesses.

OTTO HOFFMANN.

Witnesses:
A. S. HOGUE,
J. GRUND.